United States Patent [19]
Battistin

[11] 4,311,061
[45] Jan. 19, 1982

[54] LINEAR MECHANICAL VARIATOR

[76] Inventor: Ferdinando Battistin, Via Costanza, 41, Milano, Italy

[21] Appl. No.: 957,320

[22] Filed: Nov. 2, 1978

[30] Foreign Application Priority Data

Nov. 7, 1977 [IT] Italy ................. 29371 A/77

[51] Int. Cl.³ ............................................ F16H 15/40
[52] U.S. Cl. .................................... 74/190.5; 74/199; 74/208
[58] Field of Search ....................... 74/190.5, 199, 208

[56] References Cited

U.S. PATENT DOCUMENTS

| 3,011,363 | 12/1961 | Kirschey | 74/208 |
| 3,082,634 | 3/1963 | Battistin | 74/199 |
| 3,181,381 | 5/1965 | Jorgensen | 74/199 |

FOREIGN PATENT DOCUMENTS

| 759773 | 10/1956 | United Kingdom . |
| 905090 | 9/1962 | United Kingdom . |
| 946850 | 1/1964 | United Kingdom . |
| 996933 | 6/1965 | United Kingdom . |
| 1013676 | 12/1965 | United Kingdom . |

Primary Examiner—Kenneth Dorner

Attorney, Agent, or Firm—Manfred M. Warren; Robert B. Chickering; Glen R. Grunewald

[57] ABSTRACT

A linear mechanical variator or stepless variable speed drive of the type wherein the transmission ratio between two members or shafts is varied by increasing or reducing the center distance between a radial discs unit of the variator associated with one of said shafts, and a roller crown unit of the variator, associated with the other of said shafts, the rollers being interposed between the discs. The variator further comprises: a sleeve portion on one of said shaft, a disc-holder shaft carrying an end disc of said radial discs, a bush sliding on said disc-holder shaft and carrying a second end disc of said radial discs, possible intermediate discs being located between said end discs; said discs being of tapering shape; said bush and disc-holder shaft being slightly spring urged to a position of approach for the end discs; means carried on one element, disc-holder shaft or bush, to engage the other element, and a cam on said sleeve; an edge of said sleeve acting against on the other of said elements, the whole being arranged to provide the adherence pressure of the discs on the rollers as a function of the transmitted torque.

6 Claims, 6 Drawing Figures

LINEAR MECHANICAL VARIATOR

This patent application is concerned with the field of speed variators to vary the transmission ratio between two possible extreme ratios from a driving shaft to a driven shaft. It particularly relates to mechanical speed variators capable of continuous variation, that is to say stepless variable speed drives.

Stepless type of variators are both applied and continuously studied in motoring field, where at present only hydraulic type of variators have been widely accepted, but which have some disadvantages (such as poor ratio, low efficiency, need of using auxiliary gears and relevant clutches, thereby resulting in undue costs), whereas the hitherto tested mechanical type of variators were not successful from operation standpoint.

It is the object of the present invention to provide a stepless type of mechanical variator, particularly but not exclusively applicable to automotive makings, which is extremely reliable and operates with high efficiency, in the order of those achievable by a mechanical gearbox or transmission.

Such objects are accomplished by a linear mechanical variator comprising between a driving shaft and a driven shaft at least one disc system or unit and one roller ring or crown system or unit, with the rollers arranged with the axes tangential to a circumference coaxial with the ring or crown, the two systems or units being pressed in contact with each other, one of the units (either discs or roller rings) being the driving member, and the other unit (either roller rings or discs) being the driven member, the change in ratio being effected by relative radial movements of one unit with respect to the other unit.

According to a feature of the present application, the variator construction is such that the contact pressure between discs and roller crowns or rings varies as a function of the applied torque. Particularly, the movement is transmitted from a sleeve portion of the driving shaft to a hollow bush and shaft assembly coaxial and carrying the discs by means of a cross pin, which at the opposite ends carries rings bearing against cams on the sleeve of the driving shaft.

According to another feature of the present application, the construction of the roller crowns comprises an annular portion having arc seats open to the crown axis and radiuse on the bottom, each of said seats having inserted therein a cylindrical insert supporting one, two or more juxtaposed sets of rollers, all of the rollers being retained in place by an inner circular band.

In a variator according to the present application, the friction occurring in ratio change is minimized since the contact between roller crowns and discs, also owing to a slightly conical shape of the discs, occurs along part of the rotable rollers carried by the crowns or rings, whereby only a rolling friction is developed, and not a sliding friction opposing the variation movement. Moreover, the force pressing the disc unit and roller crown unit against each other for motion transmission varies as the transmitted torque varies, so as to avoid any slippings between discs and crowns, while not subjecting the variator parts or components to an undue constant load to prevent such slippings. The variator is of a sturdy structure, wears are minimized, while manufacturing thereof is simplified as far as possible and can be mass-produced on a large scale.

Thus, it is believed that a linear mechanical variator has been thereby provided, which is capable of very good performances, highly functional, and accordingly particularly applicable for example to automotive industry, but also advantageous in other fields or applications.

In accordance with an exemplary unrestrictive embodiment, a detailed description of a variator according to the present application will now be given with reference to the accompanying drawings, in which.

Figure 1:
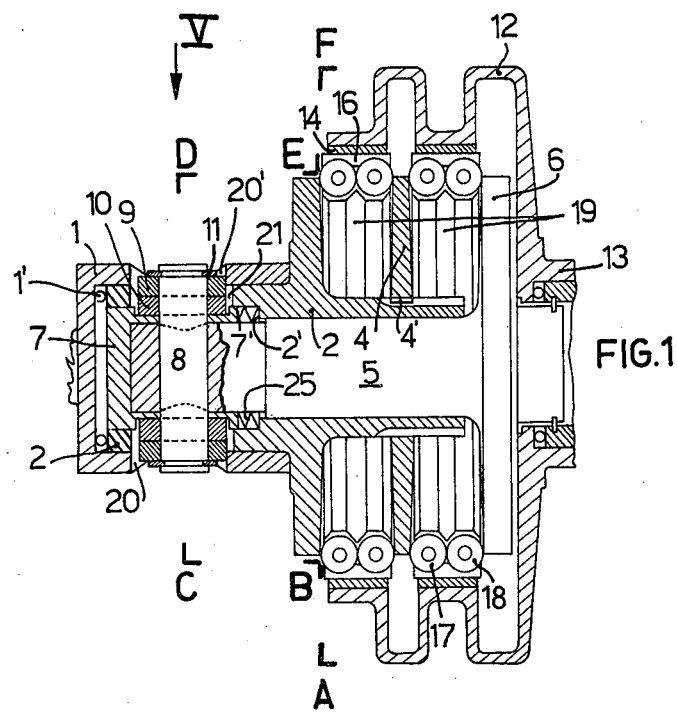
FIG. 1 is a longitudinal sectional view of the variator, taken along the axis of the driving and driven shafts, the variator being shown at a position of transmission ratio 1:1.
Figure 5:
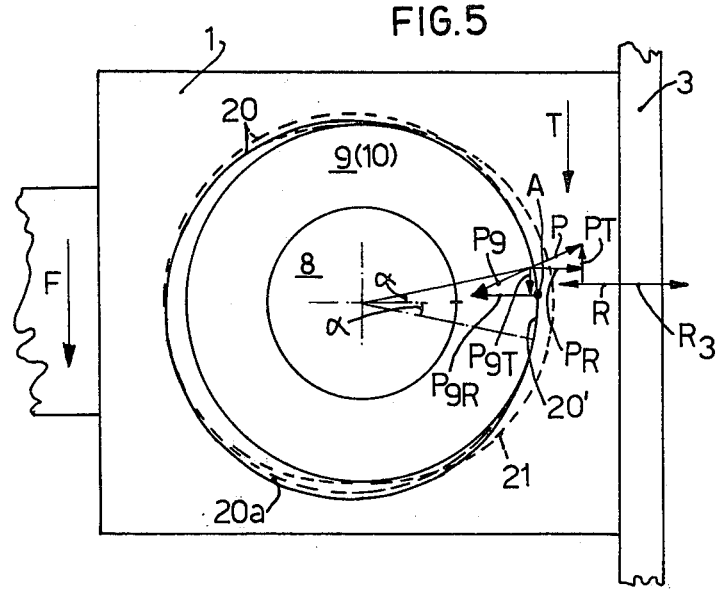
Figure 6:
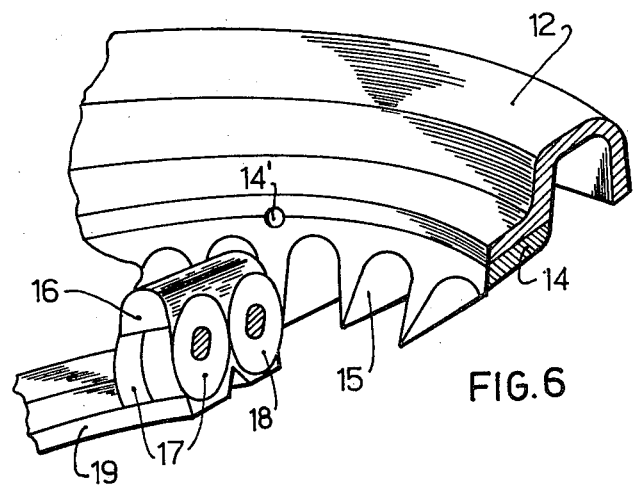

FIG. 5 is a top view of FIG. 1 according to arrow V, particularly a schematic enlarged view, showing the mutual positions of the elements comprising the coupling between the driving shaft and disc shaft, with the diagrams of the transmitted forces, to show the generation of the axial force exerting the traction or adherence pressure on the discs; and FIG. 6 is a perspective view showing a detail in assembling the rollers on the crowns or rings.

In the accompanying drawings, there is shown a variator comprising a driving shaft 1 providing at one end a sleeve, the cavity of which receiving a hollow coaxial bush 2. Between the bottom of the sleeve and bush a thrust bearing 1' is interposed. Said bush 2 carries a disc 3 radially extending and fast therewith, and a disc 4 keyed at 4' to said bush, so as to effect small axial movements. A disc-holder shaft 5 is slidably arranged within the cavity of bush 2 coaxial therewith and fast with radial end disc 6. With the exception of the outer faces of the end discs, radial discs 3, 4 and 6 are of tapered or conical configuration, with major thickness toward the axis and minor thickness at the periphery. A bush 7 having a shoulder 7' is keyed to the end of shaft 5 opposite to disc 6. A biasing or pushing spring 25 is effective between said shoulder 7' and an opposite shoulder 2'. Of course, bush 7 could be dispensed with and shoulder 7' could be carried by shaft 5. This bush 7 and the portion of shaft 5 therein received are diametrically passed through by a pin 8, the ends of which project therefrom. An outer ring 9 and an inner ring 10 are carried on each end of said pin 8, these rings being superimposed and retained by abutment rings or circlips 11. Each ring 10 is freely rotable about pin 8 and relative to ring 9, the latter being also freely rotable about pin 8 and relative to ring 10.

In order to accomodate said rings 10, provision is made in that portion of bush 2 in position corresponding thereto for elongated slots or cavities 21 having along the bush axis a slightly larger size than the diameter of ring 10 and a size transversely of the bush axis which is substantially the same as the diameter of said ring 10.

At diametrically opposite portions, apertures 20 of whichever shape and sufficient size are provided in the shaft sleeve to accomodate rings 9, one aperture 20 for each of said rings 9. Each of apertures 20 have an arc 20' at that portion thereof against which ring 9 bears, this arc acting as a cam for the purposes to be discussed about hereinafter and which may be of whichever shape and size, for example, as experimentally determined. Only by way of example, said arc 20' has been drawn as an arc of circle having a larger radius than that of ring 9.

Driving shaft 1 and bush 2, disc-holder shaft 5, discs 3, 4 and 6, and associated elements make up the driving unit for the variator. It should now be pointed out that such terms as "driving and driven" have been used herein only for explanatory convenience, since the variator could be as well reversely used, that is with assembly 1, 2, 3, 4, 5 and 6 as a driven unit.

The driven unit or assembly comprises a bell 12 fast and coaxial with bush 13 making up the driven member. This bell 12 carries two annular bodies 14 (hereinafter called also crowns or rings) keyed thereon by means of dowels 14' (FIG. 6). Such two annular bodies or crowns 14 have radial cavities 15 open toward the crown axis and semicircle connected or radiused at the bottom thereof. A substantially semicylindrically profiled insert 16 is freely slidably mounted in each cavity and is seated on the bottom radius in the cavity. In turn, said inserts are formed with two arcuate notches or cutouts with the axis thereof at right angles to the axis of the semicylindrical profile. The notches or cutouts for one insert are the seat for a pair of rollers 17 and 18. The total size of the rollers along the axis thereof is calibrated to the width of cavities 15, whereas the total size of the rollers along the diameter thereof is such that the rollers slightly project from the crowns. It is preferred in each assembly 17 and 18 to arrange a plurality of rollers of a reduced thickness instead of a roller of a larger thickness in order to reduce frictions and losses as well. Preferably, the rollers are perforated for increased resiliency in order to promote accomodation to possible tolerances in the roller diameters.

Finally, each ring 14 is internally closed by a band 19 forming an inner seat for the roller units. The insert-roller assemblies thus mounted can axially slide in the crowns, so as to be freely pressed between discs 3, 4 and 6.

The operation of the variator will now be briefly outlined.

Figure 2:
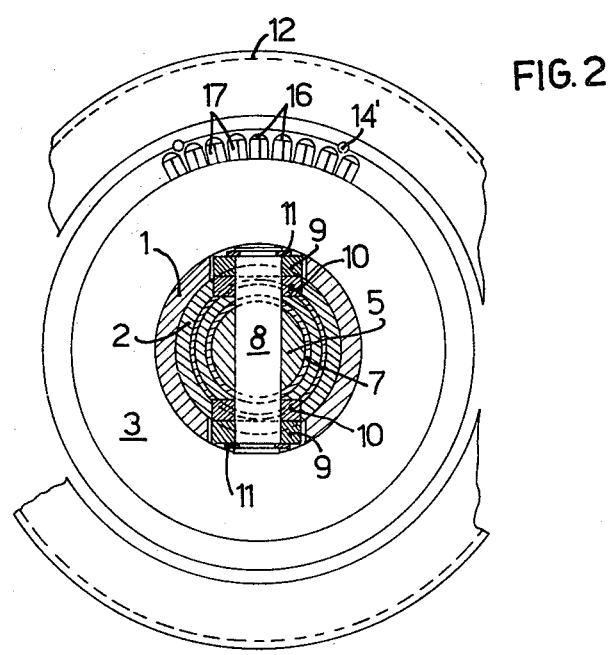
FIG. 2 is a sectional view of the variator at right angles to the shaft axis, taken along planes defined by broken line A B C D E and F of FIG. 1.

FIGS. 1, 2 and 5 show the variator at a position of ratio 1:1, that is at direct drive position. Driving shaft 1 and driven member 13 are coaxial. It is required for movement transmission that discs 3, 4 and 6 are urged against the crown rollers, so as to cancel mutual slidings. Thus, the discs and roller crowns rotate bodily as a unit. The force being required to prevent slidings would increase as the transmitted torque increases. At the rotation start, the contact between ring 9 and arc 20' is at location A (FIG. 5), and spring 25 provides for supplying an initial axial adherence force between the rings and discs. Assuming that the rotation of shaft 1 is in the direction of arrow F and shaft 1 is the driving shaft, cavity or aperture 20 will move to position 20a and the contact between ring 9 and cavity 20 moves along an arc α, in counterclockwise direction as seen in FIG. 5; and moves along an arc α in clockwise direction for a reverse rotation of driving shaft 1. Said angle α varies according to transmission ratio and will attain a maximum value at ratio 1:1 and a minimum value at the minimum ratio, and this due to the axial displacement caused by the slight tapering of the discs. Considering now the applied forces, the driving torque applied to shaft 1 can be schematically shown as a pair of forces T orthogonal to the axis of rotation. Now, only one force T, one ring 9 and associated cavity 20 will be taken into account, it being understood that the discussion would be identical for the other force, the other ring 9 and the other cavity 20.

Under running conditions, the sleeve portion of driving shaft 1, which extends between ring 9 and first radial disc 3, is wedged therebetween, and can be actually considered as a wedge, having force T due to the driving torque and reactive forces P and R of elements 9 and 3 acting thereon, which, frictions being neglected, are orthogonal to the surfaces. Under running conditions, these three forces P, T and R are actually balanced; this means that, since forces T and R are orthogonal, the component $P_R$ of force P in the direction of force R is equal and opposite to force R. This further means that the greater is force T and the greater are also forces R, P and $P_R$. Considering now elements 3 (radial disc) and 9 (ring), it clearly appears that radial disc 3 is acted upon by a force $R_3$ equal and opposite to force R, whereas ring 9 is acted upon by a force $P_9$ equal and opposite to force P. Force $P_9$ can be decomposed or separated into a component $P_{9,R}$ which is in the same direction as forces $R_3$ and $P_R$ equal thereto, and a component $P_{9,T}$ in the direction of force T. It is now apparent that, owing to the particular organization of the parts, in addition to a force causing the rotation of the shaft, bush and pin assembly about the common axis, said force T generates equal and opposite forces $P_{9,R}$ and $R_3$, axially pressing the discs and rollers, and according making up the adherence forces. It is also apparent that these adherence forces increase as force T increases, that is as the applied torque increases (and as the transmitted torque increases) and are larger if angle α is smaller (smaller transmission ratio).

When extending the discussion to the transient running condition and taking the frictions into account, it will be seen that for limited periods there will be a tangential component on ring 9 to cause a rotation thereof on pin 8.

Figure 3:
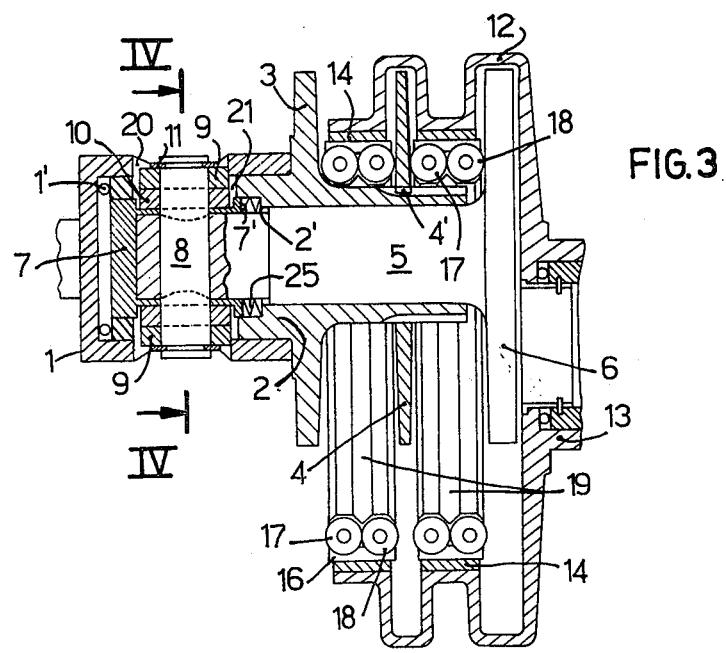
FIG. 3 is a longitudinal sectional view of the variator, taken along the axis of the driving and driven shafts similarly to FIG. 1, but with the variator at a position of maximum reduction in r.p.m. (driving and driven shafts moved away as far as possible)
Figure 4:
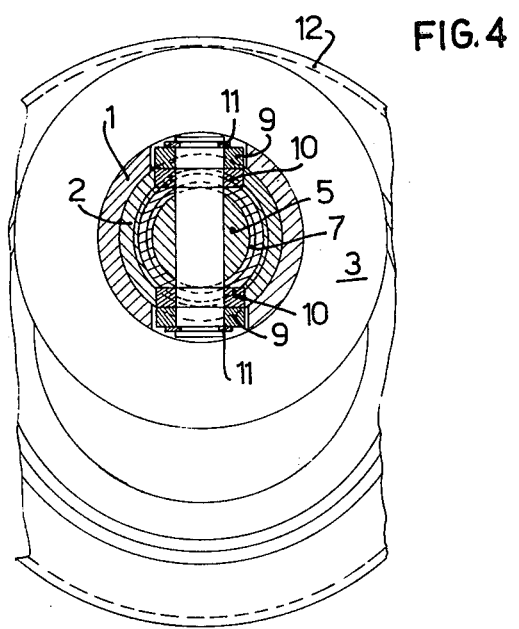
FIG. 4 is a sectional view at right angles to the axes of the variator shown in FIG. 3 according to plane IV—IV.

FIGS. 3 and 4 show the variator at position of maximum shifting of the driving and driven shafts, 1 and 13 respectively, so that the largest reduction in r.p.m. of driven shaft occurs relative to r.p.m. of the driving shaft. The passage from one position to the other is effected with minimal frictional losses, since only a rolling contact occurs during variation or transition owing to the arrangement of the rollers and tapering of the discs.

As previously mentioned, according to the present invention, both the discs and rollers may be used as driving members, or as driven members.

In the same transmission, such members could be also alternately individually used as a driving member or as a driven member. For example, as applied to motor vehicles, shaft 1 is the driving shaft and shaft 13 is the driven shaft under standard performance of the vehicle with running engine, and shaft 13 from a driven shaft becomes the driving shaft and shaft 1 from driving shaft becomes the driven shaft upon braking. Still in motor vehicles, the use of the series arrangement of two disc-crown units, as described, is particularly suitable and advantageous, so that the intermediate shaft, which is the driven shaft for the first unit and the driving shaft for the second unit can be shifted relative to the driving shaft of the first unit and the driven shaft of the second unit, the latter remaining coaxial. In this case, the total ratio is the square of the single ratios of each unit. For example, at direct drive, that is with the three shafts being concentric, the ratio will be $(1:1)^2=1$, and should the shifting of intermediate shaft produce in each of the elements a ratio of 1:2, the total ratio will be $(1:2)^2=1:4$.

However, shifting of the intermediate shaft can be provided and controlled by oleodynamic and automatic devices, that can be readily manually calibrated from the driver both at running and braking conditions.

Since the invention has been described and shown by mere way of unrestrictive example, it should be clearly understood that many changes can be made to the assembly and details thereof (for example, the number of discs and roller crowns may vary from two discs and one interposed crown; in each of the cavities the rollers may be in a number other than 2; the shape of cavity 20 may be different from that shown, etc.) without departing for this from the basic principles on which the present invention is based.

What I claim is:

1. In a mechanical variator comprising two shaft members; a radial disc system including two discs coupled for rotation with a first shaft member, said discs being tapered toward their periphery; and a roller crown system comprising a roller crown and a plurality of rollers, each of said rollers disposed within said roller crown so as to rotate about an axis lying in a plane perpendicular to a second shaft member, said roller crown system being coupled for rotation with said second shaft member and being interposed between said discs, the improvement in said mechanical variator comprising, in combination:
   a first disc-holder element carried by said first shaft member and having a first disc of said radial disc system mounted thereto;
   a second disc-holder element carried by said first shaft member coaxially with said first disc-holder element and having a second disc of said radial disc system mounted thereto, said second disc-holder element being axially slidable relative to said first disc-holder element;
   spring means mounted relative to said disc-holder elements for urging relative axial displacement of said disc-holder elements, wherein said discs are urged into contact with said roller crown system;
   a sleeve portion on said first shaft member, said portion being provided with a cam surface; and
   torque-responsive means coupling said disc-holder elements and said sleeve portion for rotation and formed for urging relative axial displacement of said disc-holder elements, wherein said discs are urged into contact with said roller crown system, said torque-responsive means engaging said cam surface at a position dependent upon the torque transmitted by said first shaft member, thereby providing a torque-responsive frictional coupling force between said radial disc system and said roller crown system.

2. A mechanical variator as defined in claim 1, further comprising:
   at least one intermediate disc mounted on one of said disc-holder elements between said two discs, said intermediate disc being axially slidable relative to said one disc-holder element, thereby enhancing the effectiveness of said torque-responsive frictional coupling force.

3. A mechanical variator as defined in claim 1,
   said roller crown comprising an annular body having a series of slots arranged along a circumference of said annular body and opening inwardly toward the axis of said annular body, the outwardly facing portions of said slots having semicircular profiles; and
   substantially semicylindrical inserts seated within said outwardly facing portions, said inserts being freely slidable axially with respect to said slots, each of said inserts accommodating an assembly of rollers, the rollers of said assembly protruding from the sides of said roller crown for engagement with said radial disc system.

4. A mechanical variator as defined in claim 3, wherein:
   said assembly includes rollers being disposed in parallel relation to one another and comprising a thickness equal to the thickness of said slots, said rollers being perforated, said assembly co-acting with said torque-responsive force to reduce unnecessary friction.

5. A mechanical variator as defined in claim 1, further comprising a band with profile having a plurality of arcs formed to provide an inner seat for said rollers.

6. A mechanical variator as defined in claim 1, wherein:
   said torque-responsive means comprises a pin carried diametrically in one disc-holder element and passing through said disc-holder elements and sleeve portion; and at each end of said pin two rings being mounted in juxtaposition for rotation about the axis of said pin; and
   said cam surface comprises two diametrically opposed apertures in said sleeve portion, each of said apertures having a contact arc engaging an outer of said rings, the inner of said rings being disposed in apertures in the other disc-holder element, said apertures being elongated with respect to the axis of said other disc-holder element.

* * * * *